United States Patent [19]

Kido et al.

[11] Patent Number: 5,651,926
[45] Date of Patent: Jul. 29, 1997

[54] METHOD FOR PREVENTING EMISSION OF FLUORESCENCE FROM POLYALKYLENENAPHTHALENE-2,6-DICARBOXYLATE

[75] Inventors: Nobuaki Kido; Shunichi Matsumura, both of Iwakuni, Japan

[73] Assignee: Teijin Limited, Osaka, Japan

[21] Appl. No.: 554,555

[22] Filed: Nov. 6, 1995

[30] Foreign Application Priority Data

Nov. 8, 1994 [JP] Japan .................................. 6-273625

[51] Int. Cl.$^6$ .................................................. C09K 11/00
[52] U.S. Cl. ..................... 264/21; 264/129; 264/173.16; 427/393.5; 427/420; 427/421; 427/428; 427/429; 427/430.1
[58] Field of Search ..................... 264/21, 129, 173.16; 156/245; 427/157, 393.5, 420, 421, 428, 429, 430.1

[56] References Cited

U.S. PATENT DOCUMENTS

| 3,325,446 | 6/1967 | Chang et al. | 524/89 |
|---|---|---|---|
| 4,353,959 | 10/1982 | Olson et al. | 428/331 |
| 5,310,857 | 5/1994 | Jones et al. | 528/220 |
| 5,352,761 | 10/1994 | Jones et al. | 528/298 |
| 5,391,330 | 2/1995 | Jones et al. | 264/21 |

FOREIGN PATENT DOCUMENTS

| 58-179237 | 10/1983 | Japan . |
|---|---|---|
| 59-12952 | 1/1984 | Japan . |
| 2-38128 | 2/1990 | Japan . |
| 2-150431 | 6/1990 | Japan . |
| 5-86973 | 12/1993 | Japan . |
| 6-37212 | 5/1994 | Japan . |
| WO95-04777 | 2/1995 | WIPO . |

OTHER PUBLICATIONS

Cheung, et al. "Photophysical Processes In Dimethyl-2, 6-Naphthalene-dicarboxylate And Poly(Ethylene-2, 6-Naphthalenedicarboxylate", Journal of Polymer Science: Polymer Letters Edition, vol. 17, pp. 227-232 (1979).

*Primary Examiner*—Leo B. Tentoni
*Attorney, Agent, or Firm*—Sherman and Shalloway

[57] ABSTRACT

A method for preventing the emission of fluorescence from polyalkylenenaphthalene-2,6-dicarboxylate, including mixing polyalkylenenaphthalene-2,6-dicarboxylate and at least one compound selected from cyclic imino esters and quinoxalines. The above cyclic imino esters and quinoxalines have an absorption intensity E, defined by the following expression:

$$\overset{1\%}{\underset{1\ cm}{E}} = A/c \cdot d$$

wherein

A is an absorbance measured in 1,1,2,2-tetrachloroethane at a concentration c (g/100 ml) and an optical path d (cm), of more than 200 at an ultraviolet wavelength range of 340 to 400 nm. And when a coating layer containing at least one ultraviolet absorber is formed on the surface of a molded article made of the above fluorescence-emission preventive mixture, a synergistic suppression of the emission of fluorescence can be obtained.

11 Claims, No Drawings

METHOD FOR PREVENTING EMISSION OF FLUORESCENCE FROM POLYALKYLENENAPHTHALENE-2,6-DICARBOXYLATE

DETAILED DESCRIPTION OF THE INVENTION

This invention relates to a method for preventing the emission of fluorescence from polyalkylenenaphthalene-2,6-dicarboxylate. More specifically, it relates to a method for preventing the emission of fluorescence by including a cyclic imino ester which absorbs light having a specific wavelength range or a quinoxaline in polyalkylenenaphthalene-2,6-dicarboxylate.

In recent years, polyalkylene naphthalate has been used for various applications, making use of its excellent performance. For example, polyethylene naphthalate is used as a film having high strength and high elastic modulus in various types of audio tapes and video tapes. Polybutylene naphthalate is also used for various resin applications. However, it has been known that polyalkylene naphthalate has the undesirable property of emitting pale fluorescence when it is exposed to ultraviolet light. For this reason, it has been pointed out that this material has a problem with its outer appearance for application in food packages and beverage bottles. As for fluorescence of such polyalkylene naphthalate, studies on fluorescence of a poly(1,2-ethylene-2,6-naphthalene dicarboxylate) film have been reported in the Journal of Polymer Science: Polymer Letters Edition, vol.17, pp. 227–232 (1979), for example, which discloses that the fluorescence is emitted from the an excimer of naphthalate.

It has been reported in the specification of U.S. Pat. No. 5,310,857 that fluorescence of such polyalkylene naphthalate can be suppressed efficiently by copolymerizing a relatively small amount of an aromatic ketone. However, since an aromatic ketone as a copolymerizable component is reacted with other constituent component(s) of a polymer, this method involves such problems that it is necessary to change the kind of a polymer at the time of production, that the polymer becomes expensive because the aromatic ketone is peculiar, and that a polymer having a high degree of polymerization is hardly obtained because of low reactivity of the aromatic ketone.

JP-A-59-12952 (the term "JP-A" as used herein means an "unexamined published Japanese patent application") discloses a method for protecting various types of resins from ultraviolet light by mixing a compound having a cyclic imino ester in the molecule with the resins. This method is excellent as a method for protecting various types of resins from ultraviolet light, but this application is totally silent about a method for suppressing the emission of fluorescence from a fluorescence emitting polymer such as polyalkylene naphthalate.

Use of a phenylquinoxaline as a stabilizer for a polymer having a halogen atom in the molecule is disclosed in the specification of U.S. Pat. No. 3,325,446, but it is totally silent about the prevention of fluorescence from the polymer.

The specification of U.S. Pat. No. 5,391,330 discloses a process comprising melt-blending a naphthalenedicarboxylic acid containing polymer with 0.1 to 5% by weight of a fluorescence quenching compound, but it is totally silent about a cyclic imino ester or a quinoxaline as a fluorescence quenching compound.

A large number of technologies for improving the hardness and weatherability of resin molded article by forming a protective coating on the surface of the resin molded article of polyester or polycarbonate have been disclosed. For instance, JP-B-60-53701 (the term "JP-B" as used herein means an "examined published Japanese patent application") discloses a technology for improving the weatherability of a polycarbonate product coated with an abrasion resistance silicone by including an ultraviolet light absorptive compound in an adhesion promoting primer layer containing a thermosetting acrylic polymer. JP-A-58-179237 discloses a surface treatment method for polycarbonate resin molded article, which comprises the steps of applying a topcoating agent comprising a polyacrylate resin, ultraviolet absorber, organic solvent and colloidal silica to a polycarbonate resin and thermally curing the resin. JP-A-2-150431 teaches a technology in which a primer layer formed of a methacrylate resin and a benzotriazole-based ultraviolet absorber is formed on the surface of a plastic and then a surface coating layer formed of a silica-based thermosetting resin and a benzophenone-based ultraviolet absorber is formed on the primer layer. In the JP-A-2-38128 disclosing a method for protecting the surface of polyethylene terephthalate molded article, there is a description that an ultraviolet absorber may be added to a surface coating layer as required. JP-B-5-86973 discloses a technology in which an ultraviolet absorber is contained in a coating layer formed on the surface of a transparent polyester base material. Further, JP-B-6-37212 teaches a method for protecting a transparent resin from ultraviolet light by including an ultraviolet absorber in a silicone-based surface coating layer.

However, these methods for suppressing the transmission of ultraviolet light by forming a surface coating layer are aimed to prevent the contents of a container or a coated resin from deteriorating by ultraviolet light. Further, there is no description in any of the above prior arts of whether or not it is possible to apply these methods to polyethylene naphthalate molded article. Moreover, the ultraviolet light range that should be mainly cut off by the above coating layers and the ultraviolet light range at which polyethylene naphthalate emits fluorescence the most strongly differ from each other.

An object of the invention is therefore to provide a method for suppressing the emission of fluorescence from polyalkylenenaphthalene-2,6-dicarboxylate.

Another object of the invention is to provide a method for suppressing the emission of fluorescence from polyalkylenenaphthalene-2,6-dicarboxylate by suppressing change of a ground-state molecule of polyalkylenenaphthalene-2,6-dicarboxylate to an excimer thereof on exposure to ultraviolet light.

A further object of the invention is to provide a method for preventing polyalkylenenaphthalene-2,6-dicarboxylate from emitting fluorescence on exposure to ultraviolet light by including a cyclic imino ester or a quinoxaline which is characterized in that its absorption intensity exceeds 200 at an ultraviolet wavelength range of 340 to 400 nm.

A still further object of the invention is to provide a method for preventing polyalkylenenaphthalene-2,6-dicarbooxylate from emitting florescence more effectively and advantageously by further forming a coating layer containing a specific ultraviolet absorber on the surface of the polyalkylenenaphthalene-2,6-dicarboxylate which has been prevented from emitting fluorescence by the above method of the present invention.

Still another object of the invention is to provide a method for producing a polyalkylenenaphthalene-2,6-dicarboxylate resin composition suitable for application in various packages, beverage bottles, containers, tubes, films, covers and cases, industrially advantageously, which does not emit fluorescence for deteriorating its outer appearance on exposure to ultraviolet light.

Other objects and advantages of the invention will become more apparent from the following description.

According to the present invention, the above objects and advantages of the present invention can be first attained by a method for preventing the emission of fluorescence from polyalkylenenaphthalene-2,6-dicarboxylate, which is characterized in that change of a ground-state molecule of polyalkylenenaphthalene-2,6-dicarboxylate to an excimer thereof on exposure to ultraviolet light is suppressed by mixing (1) 100 parts by weight of polyalkylenenaphthalene-2,6-dicarboxylate which contains a recurring unit represented by the following. formula (I):

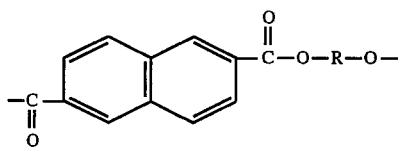

wherein

R is an alkylene group having 2 to 6 carbon atoms, in an amount of at least 80 mol % based on the total of recurring units, and (2) 0.01 to 5 parts by weight of at least one compound selected from the group consisting of a cyclic imino ester represented by the following formula (II):

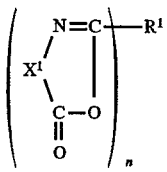

wherein $X^1$ is a divalent aromatic group having the two bonds shown in the above formula at 1,2-positions, n is 1, 2 or 3, and $R^1$ is an n-valent aromatic hydrocarbon group which may contain a hetero atom or $R^1$ may be a direct bond when n is 2, and a quinoxaline represented by the following formula (III):

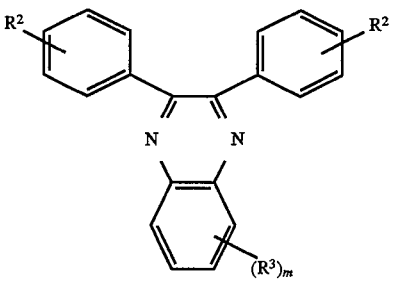

wherein $R^2$ is hydrogen atom, a halogen atom, an alkyl group having 1 to 20 carbon atoms, an alkoxy group having 1 to 20 carbon atoms, an alkyloxycarbonyl group having 2 to 20 carbon atoms or an acyl group having 2 to 20 carbon atoms, $R^3$ is an alkyl group having 1 to 6 carbon atoms or a halogen atom, and m is 0, 1, 2, 3 or 4, said at least one compound having an absorption intensity E, defined by the following expression (IV):

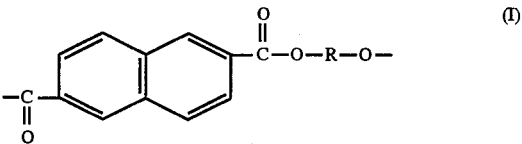

wherein

A is an absorbance measured in 1,1,2,2-tetrachloroethane at a concentration c (g/100 ml) and an optical path d (cm), of more than 200 at an ultraviolet wavelength range of 340 to 400 nm.

The polyalkylenenaphthalene-2,6-dicarboxylate used in the present invention contains a recurring unit represented by the following formula (I):

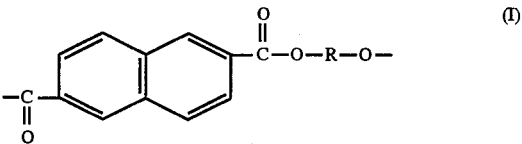

wherein

R is an alkylene group having 2 to 6 carbon atoms, in an amount of at least 80 mol % based on the total of recurring units.

In the above formula (I), R is an alkylene group having 2 to 6 carbon atoms. Illustrative examples of the alkylene group include ethylene, 1,4-butylene, 1,3-(2,2-dimethyl) propylene, 1,6-hexylene and the like.

Illustrative examples of the polyalkylenenaphthalene-2,6-dicarboxylate include poly(1,2-ethylenenaphthalene-2,6-dicarboxylate), poly(1,4-butylenenaphthalene-2,6-dicarboxylate), poly(1,3-(2,2-dimethyl)-propyleneaphthalene- 2,6-dicarboxylate), poly(1,6-hexylenenaphthalene-2,6-dicarboxylate) and the like.

Among these, the preferred is poly(1,2-ethylenenaphthalene-2,6-dicarboxylate).

When such polyalkylenenaphthalene-2,6-dicarboxylate contains at least 80 mol % of the recurring unit represented by the above formula (I), it may further contain other recurring units. A dicarboxylic acid component and a diol component constituting the other recurring units can be contained in an amount of 20 mol % or less, preferably 10 mol % or less. Illustrative examples of the dicarboxylic acid component include aromatic dicarboxylic acids such as terephthalic acid, isophthalic acid, 2,7-naphthalenedicarboxylic acid and phenylindandicarboxylic acid; and aliphatic dicarboxylic acids such as adipic acid and sebacic acid. Illustrative examples of the diol component include aliphatic diols such as 1,3-propylene glycol, 1,4-butylene glycol, 1,6-hexamethylene glycol and 1,4-cyclohexane dimethanol.

The polyalkylenenaphthalene-2,6-dicarboxylate of this invention may be in the form of a composition of a polyalkylenenaphthalene-2,6-dicarboxylate and a polymer other than it, such as PET, as far as polyalkylenenaphthalene-2,6-dicarboxylate is contained in an amount of at least 50% by weight, preferably at least 60% by weight, in the composition.

The polyalkylenenaphthalene-2,6-dicarboxylate has an intrinsic viscosity, measured at 35° C. in a solvent mixture of phenol and 1,1,2,2-tetrachloroethane (weight ratio of 60/40), of preferably at least 0.3 dl/g, more preferably at least 0.4 dl/g, particularly preferably at least 0.5 dl/g. When the intrinsic viscosity is below 0.3 dl/g, a molded article may have insufficient strength in some case.

In the present invention, the compounds to be mixed with the polyalkylenenaphthalene-2,6-dicarboxylate are a cyclic imino ester and a quinoxaline.

The cyclic imino ester used is represented by the following formula (II):

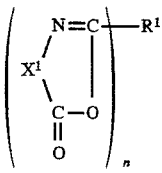
(II)

wherein $X^1$ is a divalent aromatic group having the two bonds shown in the above formula at 1,2-positions, n is 1, 2 or 3, and $R^1$ is an n-valent aromatic hydrocarbon group which may contain a hetero atom or $R^1$ may be a direct bond when n is 2.

In the above formula (II), specific examples of the divalent aromatic group represented by $X^1$ include 1,2-phenylene, 1,2-naphthylene, 2,3-naphthylene, a group represented by the following formula:

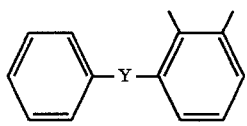

wherein

Y is selected from the group consisting of —O—, —CO—, —S—, —SO$_2$—, —CH$_2$—, —(CH$_2$)$_2$— and —C(CH$_3$)$_2$—, and a group represented by the following formula:

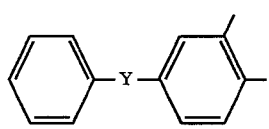

wherein

Y is defined as above.

Particularly preferred is 1,2-phenylene.

The divalent aromatic group may be substituted by a substituent which is selected from the group consisting of an alkyl group having 1 to 10 carbon atoms, such as methyl, ethyl, propyl, hexyl and decyl, an aryl group having 6 to 12 carbon atoms, such as phenyl and naphthyl, a cycloalkyl group having 5 to 12 carbon atoms, such as cyclopentyl and cyclohexyl, an aralkyl group having 8 to 20 carbon atoms, such as phenylethyl, an alkoxy group having 1 to 10 carbon atoms, such as methoxy, ethoxy and decyloxy, a nitro group, a halogen atom such as chlorine and bromine, an acyl group having 2 to 10 carbon atoms, such as acetyl, proponyl, benzoyl and decanoyl, an acyloxy group having 2 to 20 carbon atoms, such as acetoxy, propylcarbonyloxy and octylcarbonyloxy, and the like.

n is 1, 2 or 3. Depending on the value of n, $R^1$ is a monovalent, divalent or trivalent aromatic hydrocarbon group or a direct bond (n=2).

The monovalent hydrocarbon group (n=1) may be, firstly, an unsubstituted aromatic group having 6 to 12 carbon atoms such as phenyl, naphthyl and biphenyl.

The above monovalent hydrocarbon group may be, secondly, a group represented by the following formula (c):

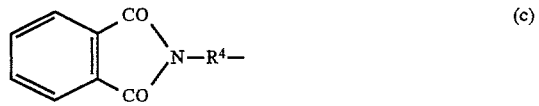
(c)

wherein $R^4$ is phenylene or naphthylene, a group represented by the following formula (d):

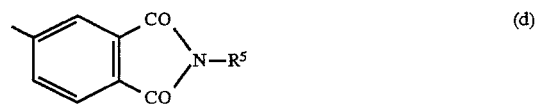
(d)

wherein $R^5$ is an alkyl group having 1 to 10 carbon atoms, a phenyl group and a naphthyl group a group represented by the following formula (e):

(e)

wherein $R^4$ and $R^5$ are defined as above, and $R^6$ is hydrogen atom or any one of the groups defined for $R^5$, or a substituted aliphatic group or aromatic group represented by the following formula (f):

(f)

wherein $R^4$ and $R^6$ are defined as above and $R^7$ is hydrogen atom or any one of the groups defined for $R^5$.

The monovalent hydrocarbon group may be, thirdly, the above aromatic group which is substituted by the same substituent as that exemplified as the substituent of the aromatic group for $X^1$. Therefore, specific examples of the unsubstituted aromatic group substituted by such substituent include tolyl, methylnaphthyl, nitrophenyl, nitronaphthyl, chlorophenyl, benzoylphenyl, acetylphenyl, acetylnaphthyl and the like.

The preferable monovalent hydrocarbon group is selected from groups represented by the above formulas (c), (d), (e) and (f), that is, substituted aromatic groups.

The divalent hydrocarbon group (n=2) may be, firstly, an unsubstituted aromatic group having 6 to 12 carbon atoms, such as phenylene, naphthylene and p,p'-biphenylene.

The divalent hydrocarbon group may be, secondly, a group represented by the following formula (g):

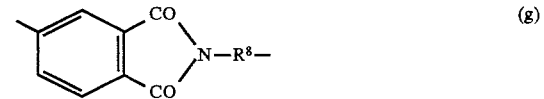
(g)

wherein $R^8$ is any one of the groups defined for $R^4$, or a substituted aliphatic group or aromatic group represented by the following formula (h):

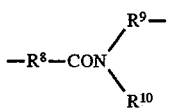

wherein

R[8] is defined as above, R[9] is any one of the groups defined for R[4], and R[10] is any one of the groups defined for R[6].

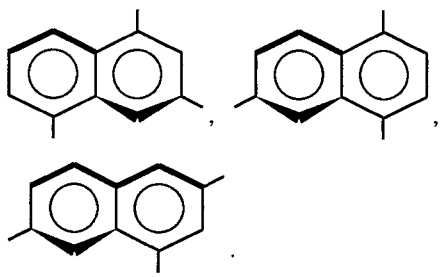

The aromatic group may be substituted by the same substituent as that for the monovalent aromatic group.

Illustrative examples of the cyclic imino ester represented by the above formula (II), used in the present invention, include:

[1] compounds when n is 1:
(101) 2-(1- or 2-naphthyl)-3,1-benzoxazin-4-one,
(103) 2-(4-biphenyl)-3,1-benzoxazin-4-one,
(105) 2-p-nitrophenyl-3,1-benzoxazin-4-one,
(107) 2-m-nitrophenyl-3,1-benzoxazin-4-one,
(109) 2-p-benzoylphenyl-3,1,-benzoxazin-4-one,
(111) 2-p-methoxyphenyl-3,1-benzoxazin-4-one.
(113) 2-o-methoxyphenyl-3,1-benzoxazin-4-one,
(115) 2-p-(or m-)phthalimidephenyl-3,1-benzoxazin-4-one,
(117) N-p-(3,1-benzoxazin-4-one-2-yl)phenyl phthalimide,
(119) N-benzoyl-4-(3,1-benzoxazin-4-one-2-yl) aniline,
(121) N-benzoyl-N-methyl-4-(3,1-benzoxazin-4-one-2-yl)aniline,
(123) 2-[p-(N-phenyl-N-methylcarbamoyl)phenyl]-3,1-benzoxazin-4-one,

[2] compounds when n is 2:
(201) 2,2'-bis(3,1-benzoxazin-4-one),
(203) 2,2'-p-phenylenebis(3,1-benzoxazin-4-one),
(205) 2,2'-p-phenylenebis(6-acetoxy-3,1-benzoxazin-4-one),

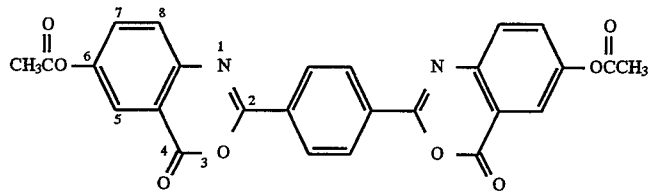

(207) 2,2'-p-phenylenebis(6-octylcarbonyloxy-3,1-benzoxazin-4-one),
(209) 2,2'-p-phenylenebis(7-chloro-3,1-benzoxazin-4-one),
(211) 2,2'-p-phenylenebis(6-chloro-3,1-benzoxazin-4-one),
(213) 2,2'-p-phenylenebis(6-methyl-3,1-benzoxazin-4-one),
(215) 2,2'-p-phenylenebis(5-methyl-3,1-benzoxazin-4-one),
(217) 2,2'-(4,4'-diphenylene)bis(3,1-benzoxazin-4-one),
(219) 2,2'-(2,6 or 1,5-naphthalene)bis(3,1-benzoxazin-4-one),
(221) 2,2'-(2-methyl-p-phenylene)bis(3,1-benzoxazin-4-one),
(223) 2,2'-(2-nitro-p-phenylene)bis(3,1-benzoxazin-4-one),
(225) 2,2'-(2-chloro-p-phenylene)bis(3,1-benzoxazin-4-one),
(227) N-p-(3,1-benzoxazin-4-one-2-yl)phenyl-4-(3,1-benzoxazin-4-one-2-yl)phthalimide,
(229) N-p-(3,1-benzoxazin-4-one-2-yl)benzoyl-4-(3,1-benzoxazin-4-one-2-yl)aniline,

[3] compounds when n is 3:
(301) 1,3,5-tri(3,1-benzoxazin-4-one-2-yl) naphthalene, and
(302) 2,4,6-tri(3,1-benzoxazin-4-one-2-yl) naphthalene.

Among the above compounds, preferred are compounds when n is 2, and more preferred are compounds represented by the following formula (II)-1:

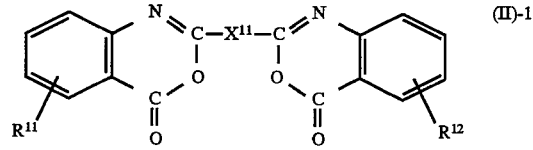

wherein

X[11] is a divalent aromatic hydrocarbon group, and each of R[11] and R[12] is independently hydrogen atom, an alkyl group having 1 to 10 carbon atoms, an aryl group having 6 to 12 carbon atoms, a cycloalkyl group having 5 to 12 carbon atoms, an aralkyl group having 8 to 20 carbon atoms, an alkoxy group having 1 to 10 carbon atoms, an acyl group having 2 to 10 carbon atoms, an The divalent hydrocarbon group may be, thirdly, the above divalent aromatic group substituted by the same substituent as that exemplified as the substituent of the aromatic group for X[1].

When n is 2, R[1] is preferably a direct bond or a substituted or unsubstituted divalent aromatic hydrocarbon group selected from the first to third groups. Particularly preferred is a substituted or unsubstituted aromatic hydrocarbon group having the two bonds at positions the farthest from each other, selected from the first or second group, such as p-phenylene, p,p'-biphenylene or 2,6-naphthylene.

The trivalent hydrocarbon group (n=3) is, for example, an aromatic group having 6 to 12 carbon atoms.

Illustrative examples of the aromatic group include.

acyloxy group having 2 to 20 carbon atoms, a nitro group and a halogen atom.

Illustrative examples of the divalent aromatic hydrocarbon group represented by $X^{11}$ in the above formula (II)-1 include phenylene, diphenylene, naphthylene and the like.

The groups and atoms defining $R^{11}$ and $R^{12}$ are the same as those provided as the substituent for the divalent aromatic group represented by $X^1$ in the formula (II).

Particularly preferred compounds represented by the formula (II)-1 include 2,2'-p-phenylenebis(3,1-benzoxazin-4-one), 2,2'-(4,4'-diphenylene)bis(3,1-benzoxazin-4-one) and 2,2'-(2,6-naphthalene)bis(3,1-benzoxazin-4-one).

The quinoxaline usable in the present invention is represented by the following formula (III):

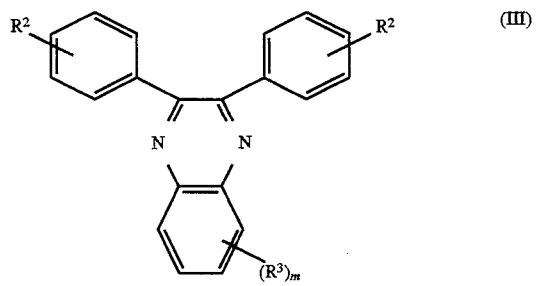

wherein $R^2$ is hydrogen atom, a halogen atom, an alkyl group having 1 to 20 carbon atoms, an alkoxy group having 1 to 20 carbon atoms, an alkyloxycarbonyl group having 2 to 20 carbon atoms or an acyl group having 2 to 20 carbon atoms, $R^3$ is an alkyl group having 1 to 6 carbon atoms or a halogen atom, and m is 0, 1, 2, 3 or 4.

In the above formula (III), examples of the halogen atom, alkyl group having 1 to 20 carbon atoms, and alkoxy group having 1 to 20 carbon atoms are the same as those provided as the substituent for the divalent aromatic group in the above formula (II). The alkyloxycarbonyl group having 2 to 20 carbon atoms is an alkoxycarbonyl group having an alkoxy group having 1 to 19 carbon atoms, such as methoxycarbonyl and ethoxycarbonyl. The acyl group having 2 to 20 carbon atoms is an acyl group having an alkyl group having 1 to 19 carbon atoms, such as acetyl and propionyl.

Examples of the alkyl group having 1 to 6 carbon atoms and the halogen atom represented by $R^3$ are the same as those provided previously.

Specific compounds of the above formula (III) include phenylquinoxalines such as (401) 2,3-diphenylquinoxaline, (403) 2,3-bis(4-methoxycarbonylphenyl)quinoxaline, (405) 2,3-bis(4-ethoxycarbonylphenyl)quinoxaline, (407) 2,3-bis(4-methoxyphenyl)quinoxaline, (409) 2,3-bis(4-acetoxyphenyl)quinoxaline, and (411) 2,3-bis(4-chlorophenyl)quinoxaline.

Among these, the preferred is 2,3-diphenylquinoxaline and 2,3-bis(4-methoxycarbonylphenyl)quinoxaline.

The above cyclic imino ester and quinoxaline used in the present invention need to be compounds having an absorption intensity E, defined by the following expression (IV), of more than 200 at an ultraviolet wavelength range of 340 to 400 nm. The absorption intensity E is defined by the following expression (IV):

$$E \begin{array}{c} 1\% \\ 1\ cm \end{array} = A/c \cdot d \quad \text{(IV)}$$

wherein

A is an absorbance measured in 1,1,2,2-tetrachloroethane at a concentration c (g/100 ml) and an optical path d (cm).

The expression "absorption intensity E of more than 200" as used herein means that the absorption intensities of the above cyclic imino ester and quinoxaline exceed 200 at part or whole of the wavelength range of 340 to 400 nm. When the absorption intensity does not exceed 200, the fluorescence suppression effect obtained by adding the compounds to the polyalkylenenaphthalene-2,6-dicarboxylate will be insufficient. The compounds to be added to the polyalkylenenaphthalene-2,6-dicarboxylate have more preferably the absorption intensities of 300 or more.

In the present invention, the cyclic imino ester and/or the quinoxaline are/is mixed in an amount of 0.01 to 5 parts by weight based on 100 parts by weight of the polyalkylenenaphthalene-2,6-dicarboxylate. When the cyclic imino ester and/or the quinoxaline are/is added in this amount, the polyalkylenenaphthalene-2,6-dicarboxylate can be prevented from changing to an excimer when it is exposed to ultraviolet light. When the addition of the compound(s) is below 0.01 part by weight, the effect of preventing fluorescence from the polyalkyelnenaphthalene-2,6-dicarboxylate is insufficient. When the addition of the compound(s) is above 5 parts by weight, deterioration in the physical properties of the polyalkylenenaphthalene- 2,6-dicarboxylate, sublimation of an additive and the like occur undesirably. The addition of the compound(s) is preferably 0.1 to 4 parts by weight, more preferably 0.5 to 3 parts by weight.

Cyclic imino esters and quinoxalines may be used alone or in combination of two or more.

To mix these compounds with the polyalkylenenaphthalene-2,6-dicarboxylate, a biaxial extruder is preferably used. The mixing temperature must be higher than the melting point of the polyalkylenenaphthalene-2,6-dicarboxylate, preferably 300° C. or less. When the mixing temperature is below the melting point of the polymer, mixing is substantially impossible, and when the temperature is above 300° C., decomposition of the polymer is liable to occur. The mixing temperature is preferably 280° to 290° C. in the case of poly(1,2-ethylenenaphthalene-2,6-dicarboxylate), for example.

According to the present invention, the emission of fluorescence from the polyalkylenenaphthalene-2,6-dicarboxylate can be prevented advantageously.

Further studies conducted by the inventors of the present invention have revealed that the emission of fluorescence from the polyalkylenenaphthalene-2,6-dicarboxylate can be prevented more efficiently and more effectively by further treating a polyalkylenenaphthalene-2,6-dicarboxylate composition obtained by the above method of the present invention with a kind of ultraviolet absorber.

Therefore, according to the present invention, there is also provided a method for preventing the emission of fluorescence from polyalkylenenaphthalene-2,6-dicarboxylate molded article, which is characterized in that change of a ground-state molecule of polyalkylenenaphthalene-2,6-dicarboxylate to an excimer thereof on exposure to ultraviolet light is suppressed by mixing (1) 100 parts by weight of polyalkylenenaphthalene-2,6-dicarboxylate which contains the recurring unit represented by the above formula (I) in an amount of at least 80 mol % based on the total of recurring units, and (2) 0.01 to 5 parts by weight of at least one compound selected from the group consisting of cyclic imino esters represented by the above formula (II) and quinoxalines represented by the above formula (III), said at least one compound having an absorption intensity E, defined by the above expression (IV), of more than 200 at an ultraviolet wavelength range of 340 to 400 nm, and in that a coating layer containing at least one ultraviolet absorber selected from the group consisting of benzotriazole-based compounds, benzophenone-based compounds and benzoxazinone-based compounds is formed on the surface of molded article after the thus obtained mixture is molded into the molded article or during molding of the mixture into the molded article.

In this method, the step of obtaining the composition (mixture) by mixing 0.01 to 5 parts by weight of the compounds having an absorption intensity of more than 200 and 100 parts by weight of the above polyalkylenenaphthalene-2,6-dicarboxylate is completely understood from the above description of the method of the present invention.

This method is intended to form a coating layer containing a specific ultraviolet absorber on the surface of molded article after the thus obtained mixture is molded into the molded article or during molding of the mixture into the molded article.

As the ultraviolet absorber, benzotriazole-based compounds, benzophenone-based compounds and benzoxazinone-based compounds may be used.

The benzotriazole-based compounds include 2-(2H-benzotriazole-2-yl)-4,6-bis(1-methyl-1-phenylethyl)phenol, 2-(2H-benzotriazole-2-yl)-4-(1,1,3,3-tetramethylbutyl)phenol, 2-(2H-benzotriazole-2-yl)-4-methylphenol, 2-(2H-benzotriazole-2-yl)-4,6-di-t-butylphenol, 2-(2H-benzotriazole-2-yl)-4,6-di-t-amylphenol, 2-(2H-benzotriazole-2-yl)-4-t-butylphenol, 2-(2'-hydroxy- 3'-t-butyl-5'-methylphenyl)-5-chlorobenzotriazole, 2-(2'-hydroxy-3',5'-di-t-butylphenyl)-5-chlorobenzotriazole and the like.

The benzophenone compounds include 2-hydroxy-4-octoxybenzophenone, 2-hydroxy-4-methoxybenzophenone, 2,2'-dihydroxy-4,4'-dimethoxybenzophenone, 2,2',4,4'-tetrahydroxybenzophenone, 2,4-dihydroxybenzophenone, 2-hydroxy-4-methoxybenzophenone-5-sulfonic acid, and the like.

The benzoxazinone-based compounds include 2-p-nitrophenyl-3,1-benzoxazin-4-one, 2-(p-benzoylphenyl)-3,1-benzoxazin-4-one, 2-(2-naphthyl)-3,1-benzoxazin-4-one), 2,2'-p-phenylenebis(3,1-benzoxazin-4-one), 2,2'-(2,6-naphthylene)bis(3,1-benzoxazin-4-one), and the like.

Among these, the preferred are benzotriazole-based compounds such as 2-(2H-benzotriazole-2-yl)-4,6-bis(1-methyl-1-phenylethyl)phenol because of a high absorbance at 375 nm and excellent solubility in various kinds of solvents.

These ultraviolet absorbers may be used alone or in combination of two or more.

The coating layer containing an ultraviolet absorber is formed on the surface of molded article after the mixture obtained in the above step is molded into the molded article or during molding of the mixture into the molded article.

To form the coating layer on the surface of the molded article after the mixture is molded into the molded article, for example, a method which comprises the steps of preparing a solution obtained by dissolving at least one selected from the ultraviolet absorbers as described above and a coating resin in a solvent, applying the solution to the molded article, drying the molded article, and then preferably heat treating the molded article is advantageously employed.

As a method for applying such a resin solution, methods such as immersion, flow coating, spray, spin coating, brushing, rolling and curtain flow coating are employable. Among these, immersion, flow coating and spray methods are preferred.

As the above coating composition, a thermoplastic resin soluble in a solvent, or a thermosetting or ultraviolet-curable resin whose starting material monomer is soluble in a solvent is preferred from a view point of moldability during the formation of a coating layer. Examples of these resins include polyester resins, silicon resins, acrylic resins and the like. Among these, thermoplastic resins such as polyester resins and thermosetting resins such as silicon resins are preferred from a view point of moldability.

Preferred polyester resins include amorphous polyesters containing isophthalic acid, terephthalic acid or adipic acid as an acid component and a glycol such as ethylene glycol and neopentylene glycol as a diol component.

When the coating layer is formed of two layers, that is a primer layer and a hard coat layer, it is preferred that (1) a thermosetting silicone resin is used as a hard coat layer and a thermoplastic polyester rein is used as a primer layer; or (2) a thermoplastic acrylic resin is used as a primer layer and a thermosetting or ultraviolet-curable acrylic resin is used as a hard coat layer.

The thickness of the coating layer is preferably 0.5 to 30 µm.

Generally speaking, the preferred thickness of the coating layer is different according to its application purpose. For instance, when the coating layer consists of two or more layers and a lower layer (primer layer) contains an ultraviolet absorber, the thickness of the coating layer is preferably 0.5 to 10 µm. When the thickness is below 0.5 µm, adhesion is liable to deteriorate and it is difficult to exhibit a sufficient fluorescence suppression effect. On the other hand, when the thickness is above 10 µm, the coating may become opaque or cracked undesirably. In this case, the thickness is particularly preferably 1 to 5 µm.

When the coating layer consists of two or more layers and an upper layer (hard coat layer) contains an ultraviolet absorber, or when the coating layer consists of a single layer (hard coat layer), the thickness of the layer is preferably 1 to 30 µm. When the thickness is below 1 µm, the hard coat layer does not function sufficiently, and when the thickness is above 30 µm, the layer is liable to be cracked. In this case, the thickness is particularly preferably 3 to 15 µm.

An alternative method for forming a coating layer on the surface of molded article after the molded article is formed comprises the steps of preparing a film containing an ultraviolet absorber separately and laminating the film on the molded article. As a polymer for preparing the film, a thermoplastic resin such as polyethylene terephthalate, polycarbonate, polyvinyl chloride, polystyrene, acrylic polymer or the like is preferably used. Among these, a homopolymer of polyethylene terephthalate and a copolymer containing an isophthalic acid as the copolymer component are preferred because of excellent heat resistance.

Since the film containing an ultraviolet absorber is produced by melt-molding the above polymer containing an ultraviolet absorber in most cases, the ultraviolet absorber used is preferably a benzoxazinone-based compound having excellent heat resistance.

The thickness of the film is preferably 10 µm or less, more preferably 5 µm or less. When the thickness is too large, it is difficult to laminate the film on the molded article.

A method for forming a coating layer on the surface of the molded article during formation of the molded article is preferably a method in which a coating layer containing an ultraviolet absorber is formed on the surface of the molded article by coextrusion during formation of the molded article. A preferred ultraviolet absorber and a preferred polymer for forming the coating layer are the same as those provided for the above method for forming a coating layer.

In this case, the thickness of the coating layer is also preferably 10 µm or less, more preferably 5 µm or less.

The coating layer contains preferably 0.1 to 10 parts by weight, more preferably 0.5 to 8 parts by weight, of an ultraviolet absorber based on 100 parts by weight of a polymer for forming the layer regardless of its formation method. When the amount of the ultraviolet absorber is above 10 parts by weight, the ultraviolet absorber is liable to bleed out from the coating layer. On other other hand, when the amount is below 0.1 part by weight, the effect obtained by using the ultraviolet absorber is small.

Preferably, the above coating layer containing the ultraviolet absorber exhibits a transmittance defined by the following expression (V):

$$\text{transmittance (\%)} = (I/I_o) \times 100 \quad\quad (V)$$

wherein

I is an intensity of transmitted light and $I_o$ is an intensity of incident light,
of 80% or less at an ultraviolet wavelength of 375 nm.

Since the recurring unit of the polyethylenenaphthalene-2,6-dicarboxylate has the maximum absorption of ultraviolet light nearly at 350 nm, it is easily misunderstood that suppression of absorption at 350 nm is effective to suppress the intensity of fluorescence. Astonishingly, the truth is that the intensity of fluorescence is the strongest at an ultraviolet wavelength around 375 nm that the recurring unit of the polyethylenenaphthalene-2,6-dicarboxylate rarely absorbs. The reason for this is unknown. However, it is considered that most ultraviolet light is absorbed by the extreme surface layer of the polyethylenenaphthalene-2,6-dicarboxylate and does not reach the inside thereof in an range where the absorption intensity of ultraviolet light is too large whereas ultraviolet light reaches the inside of the polyethylenenaphthalene-2,6-dicarboxylate in an range where the absorption intensity of ultraviolet light is small.

For the above reason, it is preferred to provide a coating layer containing an ultraviolet absorber which has a transmittance of 80% or less at an ultraviolet wavelength of 375 nm in the present invention. In this case, the intensity of fluorescence emitted when ultraviolet light having a wavelength of 375 nm is irradiated is 80% or less of that when such a coating layer is not provided. As the result, an extremely excellent fluorescence suppression effect is obtained by combining an fluorescence suppression effect obtained from the cyclic imino ester and/or the quinoxaline contained in the resin composition and a fluorescence suppression effect obtained by providing the above coating layer. As a matter of course, the lower the transmittance of ultraviolet light at a wavelength of 375 nm the greater the fluorescence suppression effect becomes. The transmittance is preferably 60% or less, more preferably 40% or less.

The surface coating layer described above suppresses the emission of fluorescence by suppressing ultraviolet light. On the other hand, the cyclic imino ester and/or the quinoxaline contained in the resin composition suppress(es) fluorescence by deactivating excimer produced after the polyalkylenenaphthalene-2,6-dicarboxylate absorbs ultraviolet light. In this way, since the compound(s) contained in the resin and the surface coating layer contribute to the suppression of fluorescence in different manners, they exhibit a synergistic effect of fluorescence suppressions.

The invention will be understood more readily with reference to the following Examples. However, these Examples are intended to illustrate the invention and not to be construed to limit the scope of the invention. In the Examples, the term "parts" as used herein means parts by weight. In the Examples, the intrinsic viscosity of the polymer is a value measured at 35° C. in a solvent mixture of phenol and 1,1,2,2-tetrachloroethane (weight ratio of 60/40). The absorption intensities $$\left( E_{1\,cm}^{1\%} \right)$$

of the cyclic imino ester and quinoxaline derivatives were calculated from the above expression by measuring their absorbances using the F-2000 Hitachi Fluorescence Spectrophotometer manufactured by Hitachi Ltd. and 1,1,2,2-tetrachloroethane as a solvent at a concentration of $5 \times 10^{-4}$ g/100 ml and an optical path of 1 cm.

EXAMPLE 1

100 parts of poly(1,2-ethylene-naphthalene-2,6-dicarboxylate) (to be abbreviated as PEN hereinafter) having an intrinsic viscosity of 0.71 and 1 part of the compound (203) were molten and kneaded with a 30 mmφ unidirectional rotary biaxial extruder (PCM30 manufactured by Ikegai Ironworks Co.) at a polymer temperature of 290° C. and an average residence time of about 20 minutes to obtain a film having an average film thickness of 0.2 mm.

Separately, a PEN film having an average film thickness of 0.2 mm was prepared as the reference PEN film from PEN having an intrinsic viscosity of 0.71 and not containing the compound (203) under the same conditions as above.

The relative fluorescence intensities (%) of Example 1 and the subsequent Examples were calculated from the following expression based on the fluorescence intensity ($I_o$) of the thus obtained reference PEN film and the fluorescence intensity (I) of the film obtained in each of the Examples.

The fluorescence intensity at an excitation wavelength of 350 nm (band path of 10 nm) and a fluorescence emission range of 400 to 600 nm (band path of 10 nm) was determined using the F-2000 Hitachi Fluorescence Spectrophotometer manufactured by Hitachi Ltd. relative fluorescence intensity (%)=(I/$I_o$)×100

EXAMPLES 2 to 13 AND COMPARATIVE EXAMPLE 1

The procedure of Example 1 was repeated except that the polymer composition, the compound and its content shown in Table 1 were changed. Results are shown in Table 1.

In Examples 2 to 6 and Comparative Example 1, relative fluorescence intensity was obtained in the same conditions as in Example 1.

In Examples 7 to 13, relative fluorescence intensity was obtained in the same manner as in Example 1 except that the fluorescence emission range was changed to 400 to 550 nm.

TABLE 1

| Ex. | Polymer composition | Compound | Maximum wave length (nm) | E (340–400 nm) | Content (parts) | Relative fluorescence intensity (%) |
|---|---|---|---|---|---|---|
| Ex. 1 | PEN | 203 | 350 | 1100 | 1 | 58 |
| Ex. 2 | PEN | 203 | 350 | 1100 | 2 | 39 |
| Ex. 3 | PEN | 401 | 346 | 400 | 1 | 54 |
| Ex. 4 | PEN | 401 | 346 | 400 | 2 | 44 |
| Ex. 5 | PEN + 5 mol % TA | 203 | 350 | 1100 | 2 | 37 |
| Ex. 6 | PEN + 5 mol % CH | 401 | 350 | 1100 | 2 | 45 |
| Ex. 7 | PEN | 205 | 356 | 920 | 2 | 45 |
| Ex. 8 | PEN | 207 | 356 | 750 | 2 | 47 |
| Ex. 9 | PEN | 403 | 344 | 430 | 2 | 41 |
| Ex. 10 | PEN | 209 | 349 | 590 | 2 | 51 |
| Ex. 11 | PEN | 211 | 359 | 970 | 2 | 43 |
| Ex. 12 | PEN | 213 | 357 | 1180 | 2 | 39 |
| Ex. 13 | PEN | 215 | 357 | 1020 | 2 | 42 |
| Com. Ex. 1 | PEN | Z | 304 | 0 | 2 | 100 |

Ex. = Example, Com. Ex. = Comparative Example
Notes)
E: E stands for $E_{1\ cm}^{1\%}$ at a wavelength range of 340 to 400 nm.
PEN: polyethylenenaphthalene-2,6-dicarboxylate
PEN + 5 mol % TA: PEN copolymerized with 5 mol % of terephthalic acid
PEN + 5 mol % CH: PEN copolymerized with 5 mol % of 1,4-cyclohexanedimethanol
Z: 2-methyl-3,1-benzoxazin-4-one

EXAMPLE 14

100 parts of PEN having an intrinsic viscosity of 0.71 and 1 part of the compound (203) were molten and mixed using a 30 mmφ unidirectional rotary biaxial extruder (PCM30 manufactured by Ikegai Ironworks Co.) at a polymer temperature of 290° C. and an average residence time of about 15 minutes. The mixture was molded into a bottle by blow molding. Thereafter, a solution was prepared by dissolving 50 parts of a saturated polyester resin (Vylon 103 manufactured by Toyobo Co.) and 3 parts of 2-(2H-benzotriazole-2-yl)-4,6-bis(1-methyl-1-phenylethyl)phenol (Tinuvin 234 manufactured by Chiba Geigy Co.) in 200 parts of methyl ethyl ketone and was applied to the surface of the bottle-shaped molded article by the spray method, and then subjected to heat treatment at 90° C. for 2 hours. The molded article was cut at the same position as that of the following reference sample to obtain a sample and measure the thickness of the coating layer of the sample. It was found that the coating layer having an average film thickness of 3 μm was formed. The sample was measured for its fluorescence intensity (I). Results are shown in Table 2.

The reference sample was prepared by cutting a relatively flat side portion of the bottle-shaped PEN molded article having an intrinsic viscosity of 0.71 to measure its fluorescence intensity ($I_o$).

The fluorescence emission amount (intensity) at an excitation wavelength of 375 nm (band path of 10 nm) in a range of 400 to 550 nm (band path of 10 nm) was obtained using the F-2000 Hitachi Fluorescence Spectrophotometer manufactured by Hitachi Ltd, and the relative fluorescence intensity was evaluated by relative comparison between the intensity (I) of the sample PEN film and that ($I_o$) of the reference sample.

relative fluorescence intensity (%)=$(I/I_o) \times 100$

EXAMPLES 15 to 18

The same procedure of Example 14 was repeated except that the compound contained in the PEN layer, its content, the ultraviolet absorber contained in the coating layer and its content were changed as shown in Table 2.

In Examples 16 and 17, a hard coat layer was formed on the coating layer. Results are shown in Table 2. The relative fluorescence intensity was obtained in the same manner as in Example 14.

TABLE 2

| | Constitution of molded article | | | | | | |
|---|---|---|---|---|---|---|---|
| | PEN layer | | Coating Layer | | | Hard coat layer | Relative |
| Ex. | Compound | Content (parts) | Polymer composition (parts) | Compound | Content (parts) | Film thickness (μm) | Film thickness (μm) | fluorescence intensity (%) |
| 14 | 203 | 2 | Polyester 50 | J | 3 | 3 | None | 14 |
| 15 | 401 | 1 | Polyester 50 | J | 3 | 1.5 | None | 17 |
| 16 | 203 | 1 | Polyester 50 | J | 4 | 3 | Silicon vanish 7 m | 14 |
| 17 | 203 | 2 | Polyester 50 | J | 2.5 | 3 | Silicon vanish 7 m | 12 |
| 18 | 203 | 2 | Polyester 50 | K | 3 | 3 | none | 11 |

Notes)
polyester: saturated polyester resin (VYLON 103 manufactured by Toyobo Co.)
silicone varnish: TOSGUAD 510 manufactured by Toshiba Silicone Co.
J: Tinuvin 234
K: 2,2',4,4'-tetrahydroxybenzophenone

EXAMPLES 19 TO 21 AND COMPARATIVE EXAMPLE 2

The same procedure of Example 14 was repeated except that the compound contained in the PEN layer, its content, the ultraviolet absorber contained in the coating layer and its content were changed as shown in Table 3.

Results are shown in Table 3.

In each Examples, the fluorescence emission amount (intensity) at an excitation wavelength of 300 to 400 nm (band path of 10 nm) in a range of 430 nm (band path of 10 nm) was obtained using the F-2000 Hitachi Fluorescence Spectrophotometer manufactured by Hitachi Ltd, and the relative fluorescence intensity was evaluated by relative comparison between the intensity (I) of the sample PEN film and that ($I_o$) of the reference sample.

TABLE 3 relative fluorescence intensity (%) = (I / $I_o$) × 100

| | PEN layer | | Coating layer | | | | Relative |
| | | | Polymer com- | | | Film thick- | fluores- cence |
| Ex. | Com- pound | Content (parts) | position (parts) | Com- pound | Content (parts) | ness (μm) | intens- ity (%) |
|---|---|---|---|---|---|---|---|
| 19 | 203 | 2 | None | J | 1.5 | 4 | 37 |
| 20 | 203 | 1 | Poly- ester 50 | J | 1.5 | 4 | 31 |
| 21 | 203 | 2 | Poly- ester 50 | J | 1.5 | 4 | 22 |
| Comp. Ex. 2 | — | — | Poly- ester 50 | J | 1.5 | 4 | 57 |

Notes)
polyester: VYLON 103
J: TINUVIN 234

EXAMPLE 22 AND COMPARATIVE EXAMPLE 3

(1) PEN having an intrinsic viscosity of 0.71 and polyethylene terephthalate (to be abbreviated as PET hereinafter) having an intrinsic viscosity of 0.64 were fed to two extruders for forming a double-layer coextruded laminate film. PEN and PET were molten and extruded from coextrusion slits at 290° C. and 280° C., respectively. The thus coextruded film was taken up from a casting drum with the PEN located on the inner side to produce a laminate film. At this point, the thickness of the PEN layer was adjusted to 200 μm and that of the PET layer to 30 μm by changing the feed amount of the polymers and the take-up speeds of the film. The thus obtained film was drawn to 3.2×3.2 times in both directions simultaneously at 120° C. and its fluorescence intensity was measured from the PET side. The intensity was represented by $I_o$.

(2) 100 parts of PEN having an intrinsic viscosity of 0.71 and 100 parts of PET having an intrinsic viscosity of 0.64 were each melt-mixed with 1 part of the compound (203) using a 30 mmφ unidirectional rotary biaxial extruder (PCM30 manufactured by Ikegai Ironworks Co.) at 290° C. and 280° C., respectively, and at an average residence time of about 15 minutes. The thus obtained mixtures were fed to two extruders for forming a double-layer coextruded laminate film and extruded from coextrusion silts at 290° C. and 280° C., respectively. A laminate film of PEN and PET was prepared in the same manner as in (1) above and its fluorescence intensity was measured in the same manner as in (1) above. The relative fluorescence intensity of the film was obtained from the fluorescence intensity I of the sample using the fluorescence intensity of (1) above. Results are shown in Table 4.

For comparison, a laminate film was prepared in the same manner as in Example 22 except that the compound (203) was not mixed with PEN, and measured for its relative fluorescence intensity. Results are shown in Table 4.

The relative fluorescence intensity was obtained in the same manner as in Examples 7 to 13.

TABLE 4

| | PEN layer | | Coating layer | | | Relative |
| | | | Polymer | | Film thick- | fluores- cence |
| Ex. | Com- pound | Content (parts) | com- position | Com- pound | Content (parts) | ness (μm) | intens- ity (%) |
|---|---|---|---|---|---|---|---|
| 22 | 203 | 1 | PET | 203 | 1 | 3 | 35 |
| Comp. Ex. 3 | — | — | PET | 203 | 1 | 3 | 62 |

What is claimed is:

1. A method for preventing the emission of fluorescence from polyalkylenenaphthalene-2,6-dicarboxylate, comprising suppressing the change of a ground-state molecule of polyalkylenenaphthalene-2,6-dicarboxylate to an excimer thereof on exposure to ultraviolet light by mixing (1) 100 parts by weight of polyalkylenenaphthalene-2,6-dicarboxylate containing a recurring unit represented by the following formula (I):

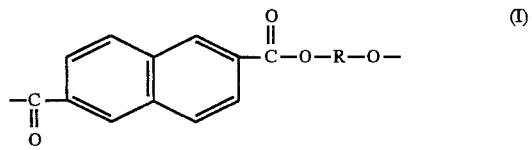

wherein

R is an alkylene group having 2 to 6 carbon atoms, in an amount of at least 80 mol % based on the total of recurring units, and (2) 0.01 to 5 parts by weight of at least one compound selected from the group consisting of a cyclic imino ester represented by the following formula (II):

wherein $X^1$ is a divalent aromatic group having the two bonds shown in the above formula at 1,2-positions, n is 1, 2 or 3, and $R^1$ is an n-valent aromatic hydrocarbon group, an n-valent aromatic hydrocarbon group which contains a hetero atom or $R^1$ is a direct bond when n is 2, and a quinoxaline represented by the following formula (III):

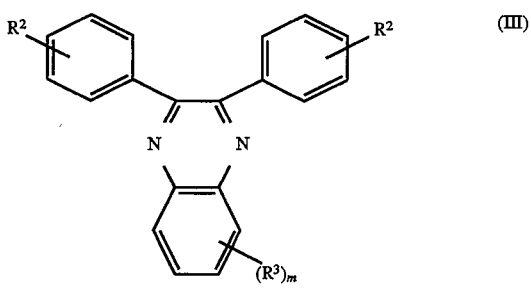

wherein $R^2$ is a hydrogen atom, a halogen atom, an alkyl group having 1 to 20 carbon atoms, an alkoxy group having 1 to 20 carbon atoms, an alkyloxycarbonyl group having 2 to 20 carbon atoms or an acyl group having 2 to 20 carbon atoms, $R^3$ is an alkyl group having 1 to 6 carbon atoms or a halogen atom, and m is 0, 1, 2, 3 or 4, said at least one compound having an absorption intensity E defined by the following expression (IV)

$$E^{1\%}_{1\,cm} = A/c \cdot d \qquad \text{(IV)}$$

wherein

A is an absorbance measured in 1,1,2,2-tetrachloroethane at a concentration c (g/100 ml) and an optical path d (cm), of more than 200 at an ultraviolet wavelength range of 340 to 400 nm.

2. The method of claim 1, wherein the cyclic imino ester is represented by the following formula (II)-1:

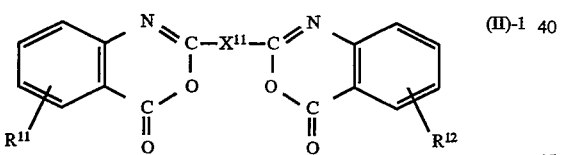

wherein $X^{11}$ is a divalent aromatic hydrocarbon group, and each of $R^{11}$ and $R^{12}$ is independently hydrogen atom, an alkyl group having 1 to 10 carbon atoms, an aryl group having 6 to 12 carbon atoms, a cycloalkyl group having 5 to 12 carbon atoms, an aralkyl group having 8 to 20 carbon atoms, an alkoxy group having 1 to 10 carbon atoms, an acyl group having 2 to 10 carbon atoms, an acyloxy group having 2 to 20 carbon atoms, a nitro group or a halogen atom.

3. The method of claim 1, wherein the cyclic imino ester is selected from the group consisting of 2,2'-bis(3,1-benzoxazin-4-one), 2,2'-p-phenylenebis(3,1-benzoxazin-4-one), 2,2'-p-phenylenebis(6-acetoxy-3,1-benzoxazin-4-one), 2,2'-p-phenylenebis(6-octylcarbonyloxy-3,1-benzoxazin-4-one), 2,2'-p-phenylenebis(7-chloro-3,1-benzoxazin-4-one), 2,2'-p-phenylenebis(6-chloro-3,1-benzoxazin-4-one), 2,2'-p-phenylenebis(6-methyl-3,1-benzoxazin-4-one) and 2,2-p-phenylenebis(5-methyl-3,1-benzoxazin-4-one).

4. The method of claim 1, wherein the quinoxaline is selected from the group consisting of 2,3-diphenylquinoxaline, 2,3-bis(4-methoxycarbonylphenyl)quinoxaline, 2,3-bis(4-ethoxycarbonylphenyl)quinoxaline, 2,3-bis(4-methoxyphenyl)quinoxaline, 2,3-bis(4-acetoxyphenyl)quinoxaline and 2,3-bis(4-chlorophenyl)quinoxaline.

5. The method of claim 1, wherein the cyclic imino ester and/or the quinoxaline are/is mixed in an amount of 0.1 to 4 parts by weight based on 100 parts by weight of polyalkylenenaphthalene-2,6-dicarboxylate.

6. A method for preventing the emission of fluorescence from a molded article of polyalkylenenaphthalene-2,6-dicarboxylate, comprising:

(i) suppressing the change of a ground-state molecule of polyalkylenenaphthalene-2,6-dicarboxylate to an excimer thereof on exposure to ultraviolet light by mixing:

(1) 100 parts by weight of polyalkylenenaphthalene-2,6-dicarboxylate containing a recurring unit represented by the following formula (I):

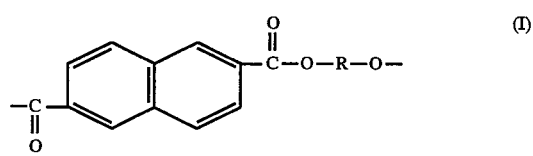

wherein

R is an alkylene group having 2 to 6 carbon atoms, in an amount of at least 80 mol % based on the total of recurring units, and (2) 0.01 to 5 parts by weight of at least one compound selected from the group consisting of a cyclic imino ester represented by the following formula (II):

wherein $X^1$ is a divalent aromatic group having the two bonds shown in the above formula at 1,2-positions, n is 1, 2 or 3, and $R^1$ is an n-valent aromatic hydrocarbon group, an n-valent aromatic hydrocarbon group which contains a hetero atom or $R^1$ is a direct bond when n is 2, and a quinoxaline represented by the following formula (III):

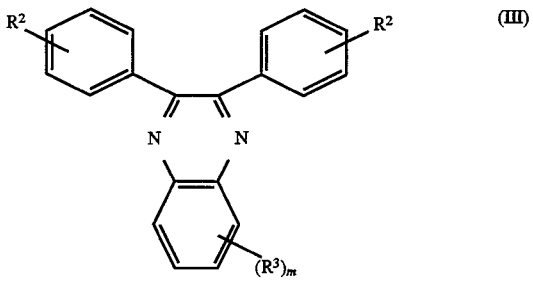

wherein $R^2$ is hydrogen atom, a halogen atom, an alkyl group having 1 to 20 carbon atoms, an alkoxy group having 1 to 20 carbon atoms, an alkyloxycarbonyl group having 2 to 20 carbon atoms or an acyl group having 2 to 20 carbon atoms, $R^3$ is an alkyl group having 1 to 6 carbon atoms or a halogen atom, and m is 0, 1, 2, 3 or 4, said at least one compound having an absorption intensity E defined by the following expression (IV):

$$E^{1\%}_{1\,cm} = A/c \cdot d \qquad (IV)$$

wherein

A is an absorbance measured in 1,1,2,2-tetrachloroethane at a concentration c (g/100 ml) and an optical path d (cm), of more than 200 at an ultraviolet wavelength range of 340 to 400 nm, to form a mixture;

(ii) molding the thus obtained mixture into a molded article; and (iii) coating a layer containing at least one ultraviolet absorber selected from the group consisting of benzotriazole-based compounds, benzophenone-based compounds and benzoxazinone-based compounds on a surface of the molded article after the thus obtained mixture is molded into the molded article or during molding of the mixture into the molded article.

7. The method of claim 6, wherein the cyclic imino ester is represented by the following formula (II)-1:

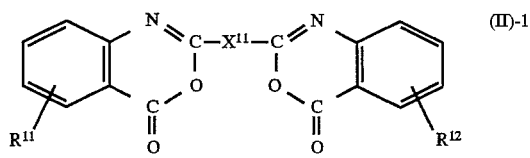

wherein $X^{11}$ is a divalent aromatic hydrocarbon group, and each of $R^{11}$ and $R^{12}$ is independently hydrogen atom, an alkyl group having 1 to 10 carbon atoms, an aryl group having 6 to 12 carbon atoms, a cycloalkyl group having 5 to 12 carbon atoms, an aralkyl group having 8 to 20 carbon atoms, an alkoxy group having 1 to 10 carbon atoms, an acyl group having 2 to 10 carbon atoms, an acyloxy group having 2 to 20 carbon atoms, a nitro group or a halogen atom.

8. The method of claim 6, wherein the cyclic imino ester is selected from the group consisting of 2,2'-bis(3,1-benzoxazin-4-one), 2,2'-p-phenylenebis(3,1-benzoxazin-4-one), 2,2'-p-phenylenebis(6-acetoxy-3,1-benzoxazin-4-one), 2,2'-p-phenylenebis(6-octylcarbonyloxy-3,1-benzoxazin-4-one), 2,2'-p-phenylenebis(7-chloro-3,1-benzoxazin-4-one), 2,2'-p-phenylenebis(6-chloro-3,1-benzoxazin-4-one), 2,2'-p-phenylenebis(6-methyl-3,1-benzoxazin-4-one) and 2,2'-p-phenylenebis(5-methyl-3,1-benzoxazin-4-one).

9. The method of claim 6, wherein the quinoxaline is selected from the group consisting of 2,3-diphenylquinoxaline, 2,3-bis(4-methoxycarbonylphenyl)quinoxaline, 2,3-bis(4-ethoxycarbonylphenyl)quinoxaline, 2,3-bis(4-methoxyphenyl)quinoxaline, 2,3-bis(4-acetoxyphenyl)quinoxaline and 2,3-bis(4-chlorophenyl)quinoxaline.

10. The method of claim 6, wherein the cyclic imino ester and/or the quinoxaline are/is mixed in an amount of 0.1 to 4 parts by weight based on 100 parts by weight of polyalkylenenaphthalene-2,6-dicarboxylate.

11. The method of claim 6, wherein the coating layer contains an ultraviolet absorber in an amount of 0.1 to 10 parts by weight based on 100 parts by weight of a polymer forming the coating layer.

* * * * *